(12) United States Patent
McLaughlin et al.

(10) Patent No.: US 6,368,207 B1
(45) Date of Patent: Apr. 9, 2002

(54) AUTOMOTIVE HEATING, VENTILATING AND AIR CONDITIONING MODULE WITH IMPROVED AIR MIXING

(75) Inventors: John W. McLaughlin, E. Amherst; H. Charles Miller, North Tonawanda; Ashraf A. Farag, Williamsville, all of NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/648,726

(22) Filed: Aug. 25, 2000

(51) Int. Cl.⁷ .................................................. B60H 1/00
(52) U.S. Cl. ........................ 454/156; 454/261; 454/269
(58) Field of Search .............................. 454/121, 156, 454/160, 261, 264

(56) References Cited

U.S. PATENT DOCUMENTS

| | | | |
|---|---|---|---|
| 1,395,938 A | * 11/1921 | Barducci | 454/261 X |
| 2,339,629 A | * 1/1944 | Fischer, Jr. | 454/261 |
| 5,653,630 A | 8/1997 | Higashihara | 454/121 |
| 5,927,380 A | 7/1999 | Scoccia | 165/11.1 |
| 5,934,361 A | 8/1999 | Parisi et al. | 165/43 |
| 5,988,263 A | * 11/1999 | Schwarz | 454/261 X |
| 6,106,386 A | * 8/2000 | Schwarz | 454/261 X |

FOREIGN PATENT DOCUMENTS

JP 59-84616 * 5/1984 .................. 454/261

* cited by examiner

Primary Examiner—Harold Joyce
(74) Attorney, Agent, or Firm—Patrick M. Griffin

(57) ABSTRACT

An HVAC housing includes a novel structure to aid the mixing of hot and cold air downstream of the evaporator and heater core. A series of space, parallel, C shaped channels running transverse to the cold air stream and generally in line with the hot air stream act to smoothly constrict the cold air stream in the gaps between the outer surfaces of the channels, while hot air concurrently runs through the inside of the channels. As the cold air passes over the edges of the channel walls, hot air is drawn out and thoroughly mixed.

3 Claims, 3 Drawing Sheets

AUTOMOTIVE HEATING, VENTILATING AND AIR CONDITIONING MODULE WITH IMPROVED AIR MIXING

TECHNICAL FIELD

This invention relates to automotive heating, air conditioning and ventilation systems in general, and specifically to such a system in which the housing or module incorporates an improved means for mixing heated and cooled air.

BACKGROUND OF THE INVENTION

Automotive heating, ventilating and air conditioning systems, HVAC systems in short, typically contain features and components shown in FIG. 1. Referring first to FIG. 1, a typical HVAC housing, indicated generally at 10, is a large, hollow box, generally a multi piece unit built up out of two or more molded plastic sub sections. A non illustrated blower and scroll housing draw in air and force it through the housing 10, first through an evaporator 12, through which the entire air flow initially passes, and then toward a heater core 14. While the evaporator 12 always has air flow through it, it may or may not be active and cold, depending on whether the compressor is active. However, it is always cold relative to the heater core 14, which always has hot engine coolant circulating through it.

Air flow through the evaporator 12 and heater core 14 is controlled by a series of internal walls, ducts and doors. In general, the air stream is bifurcated or split between a heated and a cold stream, and then the two streams are reintroduced downstream to, at least ideally, remix to a mid temperature, which depends on the proportion of the split. Specifically, an upper interior wall 16 downstream of evaporator 12 has an internal opening 18, and cold air that has passed through evaporator 12 passes straight through opening 18, unless it is blocked totally by a flapper type temperature door 20. A lower interior wall 22 has an air inlet opening 24 which, unless in is blocked by the said temperature door 20, passes some of the air that has passed through evaporator 12 through heater core 14. The degree of the split in streams between the two heat exchangers is dependent on the relative position of the temperature door 20, which can swing back and forth to apportion the air flow through both openings 18 and 24. The separate air flow (if any) diverted through opening 24 and through the hot heater core 14 is routed by another internal wall, which effectively creates an internal hot air duct 26 that ends at opening 18. The internal hot air duct ends just below a central mix area, indicated generally by the dotted area labeled "M". There, the bifurcated hot air flow is routed transversely across the outside of the internal opening 18, generally normal to the cold air flow passing through opening 18. Any separate identity of the hot air flow is quickly erased, however, as it engages the cold air flow that has exited opening 18 and the two flows mix, at least ideally, to achieve a final net temperature. From the final mix air, some flow is routed to one of several possible ducts, which are connected to outlet openings in the housing 10. Specifically, an uppermost duct 28 (generally called the window defroster duct), a mid level duct 30, and a lower heater duct 32, all receive an air flow as determined by some dedicated opening and closing means, generally referred to as mode control. In the embodiment disclosed, the mode control is a film belt or belts 34. Separate flapper type doors could also be used.

A continuing problem has been the actual attainment of a good mix of cold and hot air within the mixing space M. the two air streams have a tendency to stratify without mixing. Cold air coming out of evaporator 12 will shoot straight up and out of the defroster duct 28, for example, without the desired level of mixing with hot air that has passed through heater core 14. Known means of promoting mixing have not proved entirely satisfactory, because of cost, complexity or an undesirable extra pressure drops in the air stream. One known means includes additional, dedicated ducts within the housing 10, referred to as bleed ducts, which direct a portion of the hot air coming off of heater core 14 around and deliver it directly to or below the defroster duct 28. Another means is a separate and additional valve door that is slaved to the mode control door, and which extends out into the mix area to promote turbulence and mixing.

SUMMARY OF THE INVENTION

The subject invention provides a simpler and more cost effective means of promoting hot-cold air mix, which does not entail any extra closed ducts or valve doors, and which has a minimal impact on pressure drop in the system.

In the embodiment disclosed, a series of specially designed, parallel channels extend transversely across the internal air opening, extending past the mix area and rising from the end of the internal hot air duct toward the defroster duct above. The channels are basically half cylindrical troughs or pipes, with rounded undersides facing the evaporator air stream and concave inner surfaces facing toward the mix area. The cold air stream is forced between the gaps between the curved undersides of the troughs, where it is accelerated and constricted to a degree, but its pressure is not significantly reduced, given the smooth, curved surfaces past which it flows. Hot air from the internal duct is routed into the inside of the troughs, at the trough lower ends, and flows upwardly, essentially normal to the cold air flow. The cold air flow rushing around and past the sides of the troughs creates a turbulent wake or vortex that pulls hot air out of the troughs and mixes thoroughly with it. Improved mixing is achieved with a very simple, inexpensive, non moving additional structure, which requires no extra room. Any increase in air flow restriction is minimal.

BRIEF DESCRIPTION OF THE DRAWINGS

These and other features of the invention will appear from the following written description, and from the drawings, in which.

DESCRIPTION OF THE PREFERRED EMBODIMENT

Figure 1:
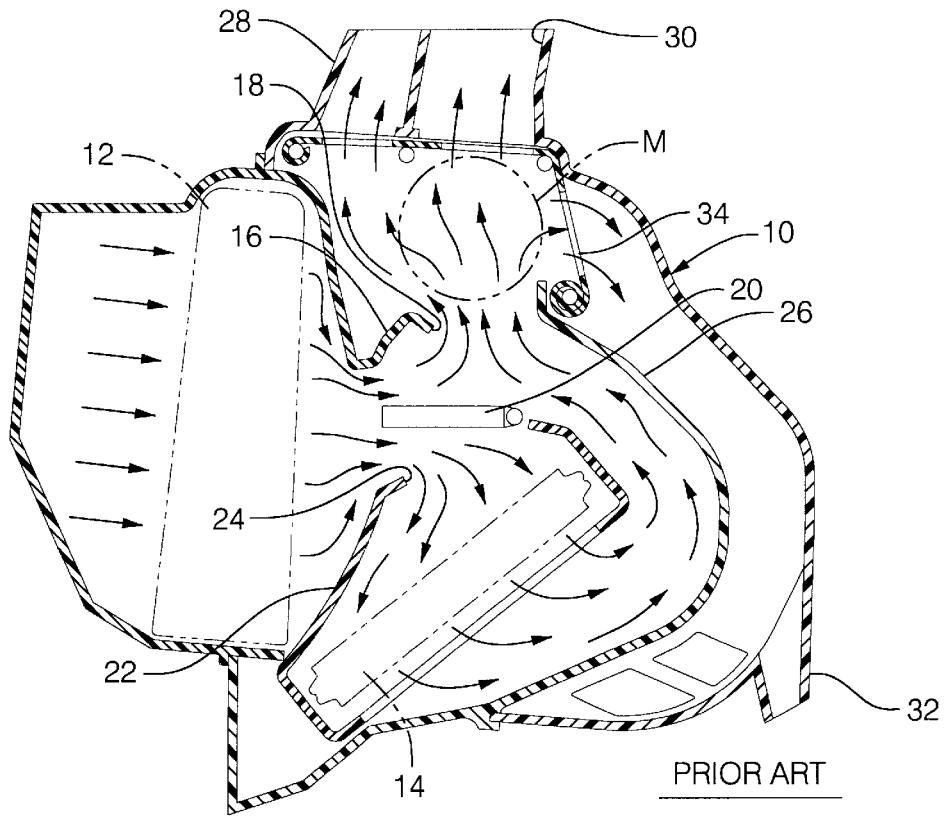
FIG. 1 is a cross section through a prior art HVAC housing.
Figure 2:
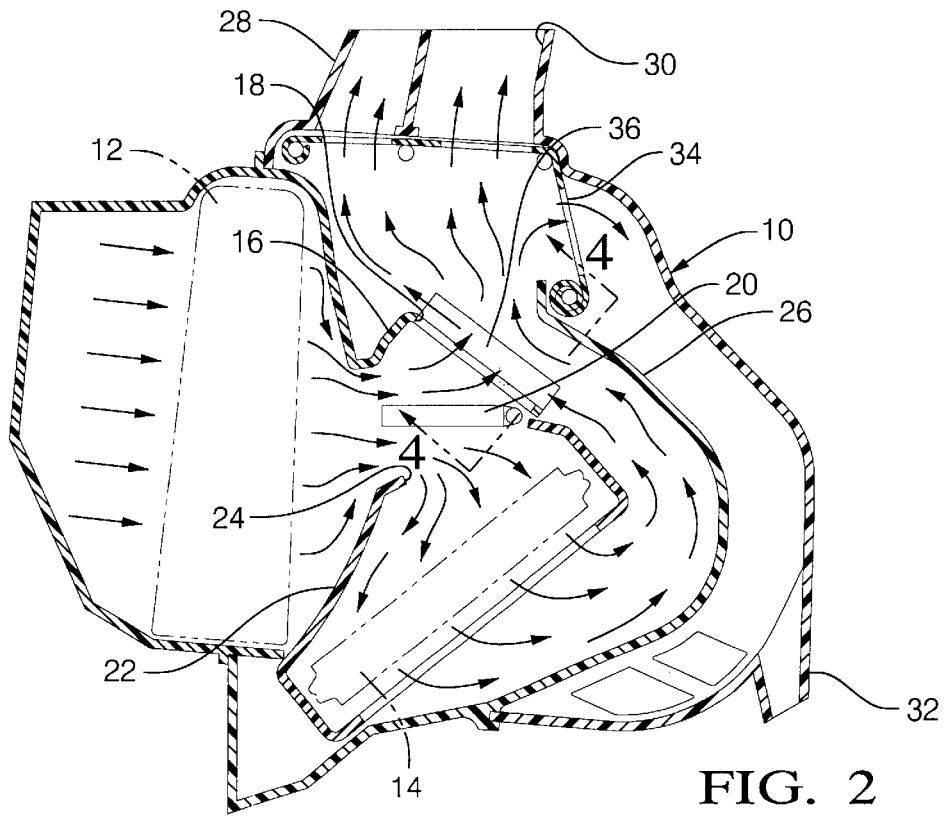
FIG. 2 is a view like FIG. 1, but showing the mix enhancing structure of the invention.
Figure 3:
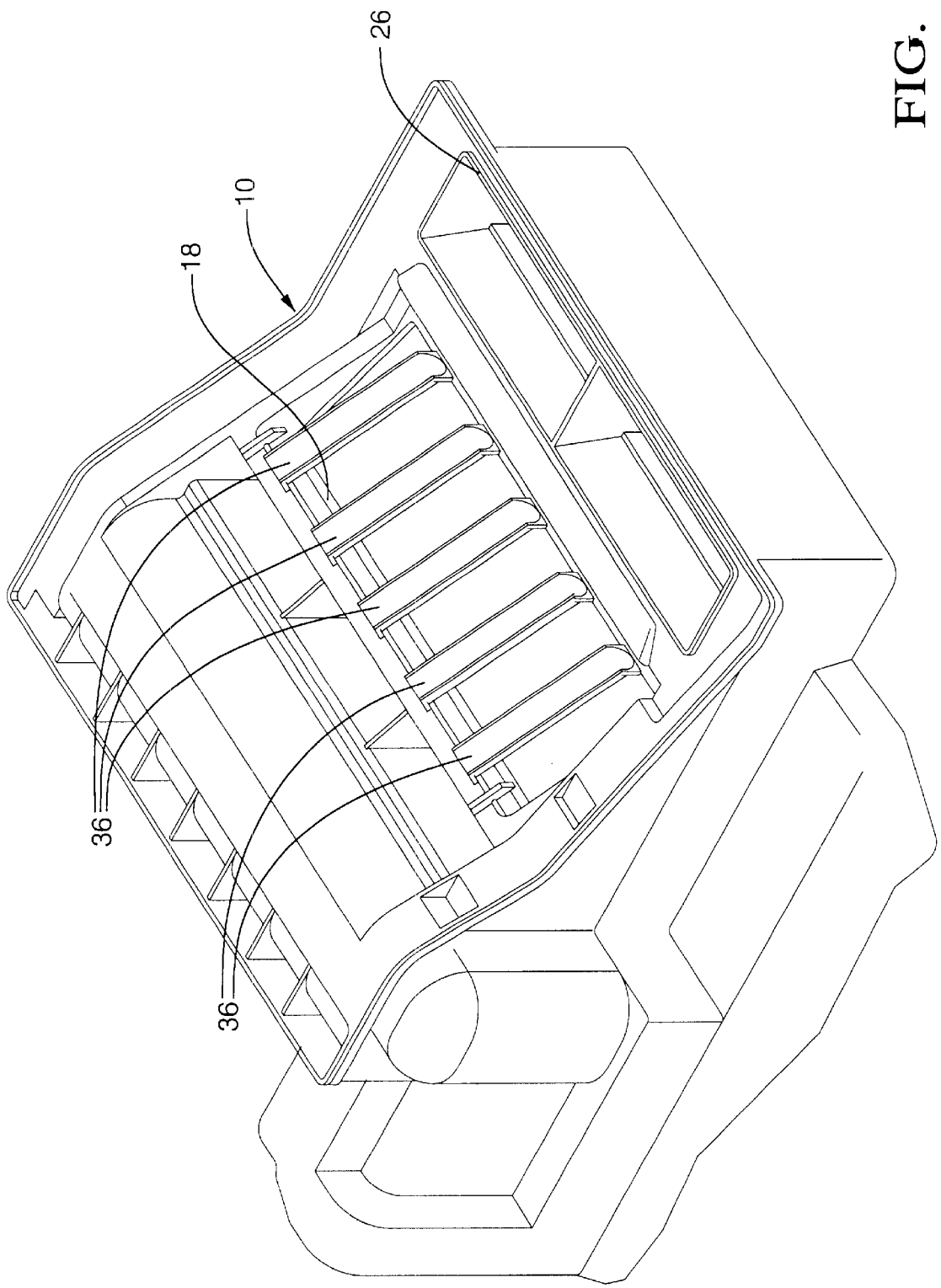
FIG. 3 is a perspective view of the mix enhancing structure of the invention.

Referring first to FIGS. 2 and 3, an HVAC housing, duct, temperature door, and mode control structure essentially identical to FIG. 1 is shown, and like elements are indicated with the same number. The air flow therethrough would be identical to that in FIG. 1 as well, but for the additional flow mix enhancing structure of the invention, which consists of a series of five half cylindrical troughs 36. The troughs 36 are parallel, molded plastic channels that extend transverse to the air opening 18, running from the terminus of the internal hot air duct 26, across the outside of the air opening 18, and ending just below the defroster duct 28. Thus, the inner, open surfaces of the troughs 36 extend generally in the same direction as the hot air flow out of internal duct 26, or at least in the general direction in which the hot air flow is initially sent as it exits the internal duct 26. As disclosed, the troughs 36 are evenly spaced apart by approximately 29 mm, approximately 19 mm in diameter and 86 mm in length.

Figure 4:
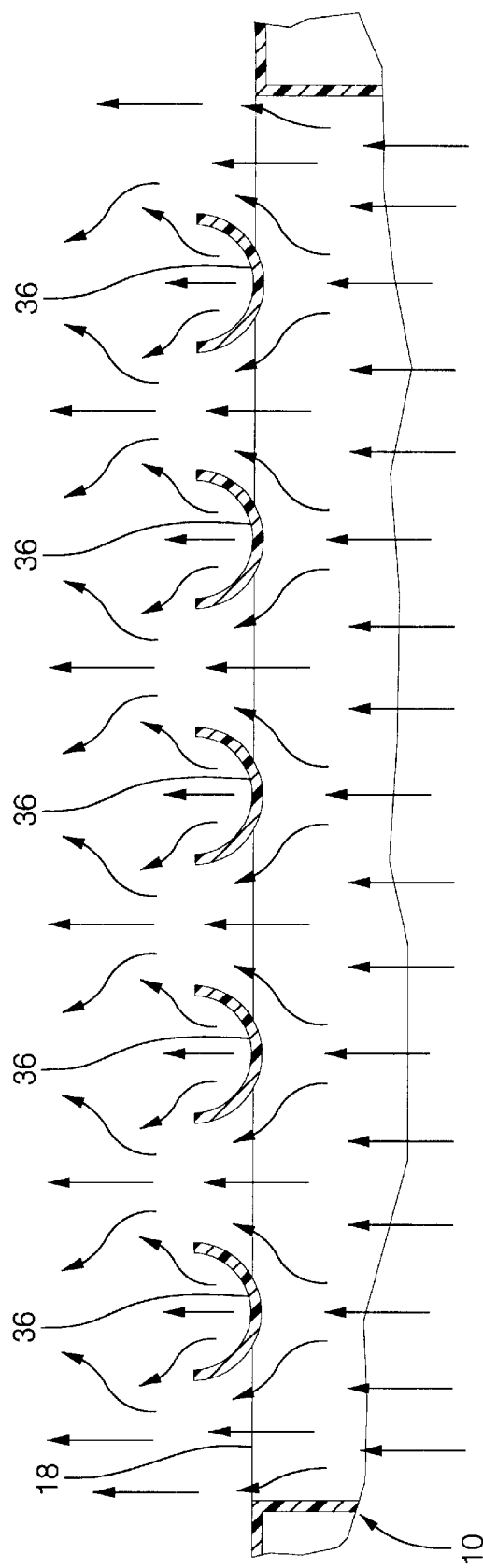
FIG. 4 is a cross section through the structure shown in FIG. 3, indicating the enhanced mixed air flow with arrows.

Referring next to FIG. 4, in cross section, the troughs 36 present half circles (half cylinders) to the cold air stream exiting the internal opening 18. The cold air flow is constricted and accelerated in flow channels formed by the gaps between the troughs 36. Given the smooth, curved outer surface of the troughs 36, this flow constriction is not precipitous, and the pressure loss in the air flow is not severe. Concurrently, hot air is flowing up out of the internal duct 28 and encountering both the lower open ends of the troughs 36, and the lower ends of the gaps between the troughs 36. The hot air that encounter the lower ends of the gaps will also encounter the 5 accelerated cold air stream flowing through the gaps, and will be immediately mixed therewith and forced upwardly. While the mixing action would be thorough at that point, this will occur near the lower edge of the opening 18, and not on the upper side of the opening 18 (below the defroster duct 28), where it has been difficult in the past assure a good mix. However, the hot air leaving the internal duct 26 and entering the lower ends of the open troughs 36 will be blocked from direct impingement with the accelerated cold air flow through the trough gaps, and will be able to flow upwardly therein, toward the other side of the opening 18, generally perpendicular to the cold air flows through the gaps. As the cold air flow through the gaps and passes the upper edges of the sides of the open troughs 36, it will create a, swirling wake or vortex, as shown by the arrows, which will assist in pulling hot air up through the troughs 36, toward the far, upper side of the opening 18. At the same time, that low pressure zone and swirling wake will tend to pull hot air up and over the sides of the troughs 36, as shown by the arrows. This swirling gives a thorough mixing of hot and cold air continuously, all along the length of the troughs 36, all through the mixing zone M described above. This mixing will extend all the way along the troughs 36 to the far side of the opening 18 and just beneath the defroster ducts 28. Thus, thoroughly mixed hot and cold air is produced where it is desired, without any dedicated bleed ducts or separate, movable mixing structures.

Variations in the disclosed embodiment could be made. More or fewer troughs 36 could be used, spaced closer or further apart, depending on the space available. The sides of the C shaped cross section of the troughs 36 can also be varied in "length," that is, could subtend more or less than the approximately 180 degree or half circles shown, or even lengthened out into a U shape. In general, the "longer" the sides of the troughs 36 are (as seen in cross section) the more hot air can be moved from the lower to the upper side of the opening 18, delaying the mixing process longer and extending it out more over the length of the troughs 36. Other cross sectional shapes could potentially work as well, such as V shaped, and the "length" of the side walls of the troughs 36 need not necessarily be constant all along the length. The walls could be shorter in areas where it was desired to shed more hot air into the mixing stream, and vice versa. Therefore, it will be understood that it is not intended to limit the invention to just the embodiment disclosed.

We claim:

1. An automotive heating, ventilating and air conditioning housing of the type having an air stream bifurcated between a cold air stream and a hot air stream, with the cold air stream being routed through an internal housing opening in a predetermined direction and with the hot air stream being routed transversely across the outside of the internal opening, so that the two air streams engage one another to be mixed to a mid temperature, characterized in that a thermal mixing enhancing structure is located across the outside of said internal opening, said structure comprising a plurality of generally parallel, spaced channels extending in the same general direction as the hot air stream flow and generally perpendicular to the cold air stream flow, said channels having outer surfaces that create smoothly converging flow spaces for the cold air stream in the gaps between said channels and continuous, open sided, open ended, flow channels for the hot air stream on the inside of the channels, whereby the cold air stream is smoothly constricted as it flows through the gaps between the channels and is caused to swirl over the sides of the flow channels to create a low pressure zone that continuously pulls hot air out of the channels all along their length to mix with the cold air stream.

2. A housing according to claim 1, further characterized in that said channels comprise generally a C shape.

3. A housing according to claim 2, further characterized in that said channels subtend approximately 180 degrees in cross section.

* * * * *